March 31. 1925.

B. E. O'HAGAN 1,531,872

ELECTRICAL REGULATING APPARATUS

Filed Oct. 26, 1923

INVENTOR:
B. E. O'Hagan,
by A. L. Vencell,
His Attorney

Patented Mar. 31, 1925.

1,531,872

UNITED STATES PATENT OFFICE.

BERNARD E. O'HAGAN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL REGULATING APPARATUS.

Application filed October 26, 1923. Serial No. 670,853.

*To all whom it may concern:*

Be it known that I, BERNARD E. O'HAGAN, a citizen of the United States, residing at Swissvale, in the county of Allegheny and State of Pennsylvania, have invented certain new and useful Improvements in Electrical Regulating Apparatus, of which the following is a specification.

My invention relates to electrical regulating apparatus, and particularly to apparatus for regulating, or keeping constant, the electrical output of generators.

I will describe two forms of apparatus embodying my invention, and will then point out the novel features thereof in claims.

Figure 1:
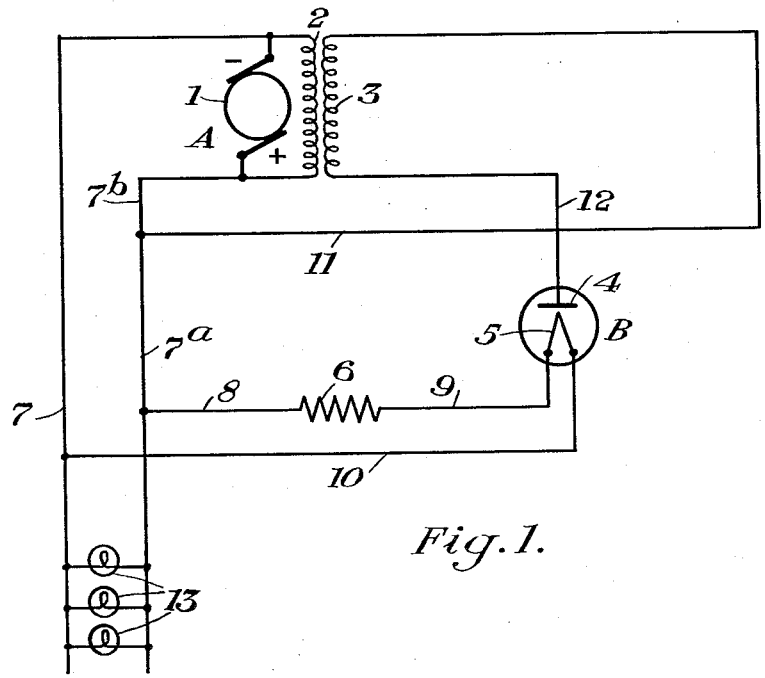
Figure 2:
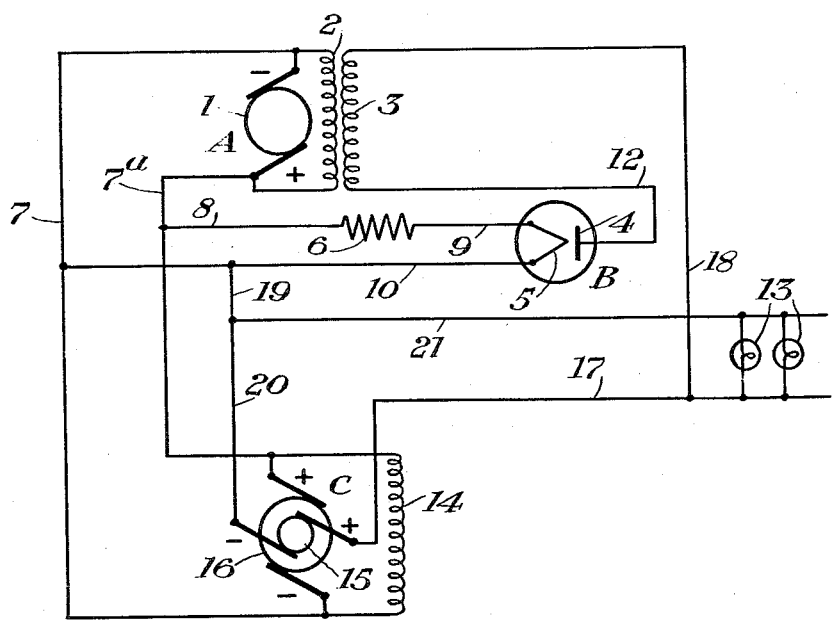

In the accompanying drawing, Fig. 1 is a diagrammatic view illustrating one form of regulating apparatus embodying my invention. Fig. 2 is a view showing one modification of the apparatus shown in Fig. 1 and also embodying my invention.

Similar reference characters refer to similar parts in each of the views.

Referring first to Fig. 1, the reference character A designates a generator, here shown as a shunt connected direct current generator comprising an armature 1, and a main field winding 2 connected in parallel therewith. This generator supplies energy to some suitable load, such as electric lamps 13, over line wires 7, 7ª and 7ᵇ. Under some conditions it is desirable to prevent fluctuation of the electro-motive force of the generator A due, for instance to variations in the speed of this generator. For this purpose I provide on generator A an auxiliary field winding 3. The current through this auxiliary winding is controlled by means of an electron tube B comprising a cathode 5 and an anode 4 in an evacuated vessel. The cathode 5 is a filament which is arranged to be heated by current from generator A over a circuit which passes from generator A, through wires 7ᵇ, 7ª and 8, resistance 6, wire 9, filament 5, and wires 10 and 7 back to generator A. The purpose of resistance 6 is to adjust the value of the current through this circuit to the proper value. Current is also supplied to auxiliary field winding 3 over a circuit which passes from generator A through wires 7ᵇ and 11, winding 3, wire 12, anode 4 and cathode 5 of tube B, and wires 10 and 7 back to generator A. It will be observed that the direction of this current is such that the flux created by winding 3 opposes the flux generated by the main field winding 2.

It is well known that the impedance of the space between the anode and cathode of tube B is dependent upon, among other things, the temperature of the cathode 5, this impedance decreasing in response to an increase in the temperature of the cathode. The parts are so adjusted that the generator delivers normal voltage under normal operating conditions. If the electromotive force of the generator tends to rise, an increased current flows through winding 3. The rise in the electro-motive force of the generator also raises the temperature of cathode 5 and this reduces the impedance of the circuit including winding 3 and hence the total increase in current through winding 3 is considerably greater than that which would result from the increased electro-motive force alone. The effect of this increased current is to increase the flux which opposes the main flux and to thereby reduce the total effective excitation of the generator. The generated electro-motive force is thus reduced and the effect is therefore to tend to keep the output electro-motive force constant. If the electro-motive force of the generator tends to decrease, the combined effect of the decreased temperature of cathode 5 and the lower electro-motive force is to considerably reduce the current through winding 3 thus increasing the total generator excitation and hence the generated voltage of the generator.

In the modification shown in Fig. 2, the generator A is used to supply energy to one armature winding 16 of a dynamotor C. This dynamotor comprises also a second armature winding 15 and a single field winding 14 connected in parallel with armature winding 16. The winding 15 delivers energy to the load 13 over wires 20, 21 and 17, usually at a considerably higher voltage than the voltage of generator A. The negative terminals of winding 15 and generator A are connected together by wires 20, 19, 10 and 7, and the cathode 5 of tube B is connected, as before, across the terminals of generator A. The auxiliary field winding 3 is, however, now supplied with current from winding 15 of dynamotor C, the circuit passing from the positive terminal of winding 15 of dynamotor C, through wires 17 and 18, winding 3 of generator A, wire 12, anode 4 and cathode 5 of tube B, and wires 10, 19 and 20 back to the negative terminal of winding 15 of dynamotor C.

The reason for supplying the auxiliary field winding 3 from the output winding 15 of the dynamotor C instead of from the generator A is that the output winding 15 has a considerably higher voltage than the generator A, and the higher the plate voltage applied to the electron tube A the lower is the current required for the filament of this tube. Of course, the lower the filament current, the less will be the power consumed by the tube and the longer will be the life of the tube.

In operation, an increase in the electromotive force delivered by generator A will increase the temperature of cathode 5 as before. In addition this increased electromotive force will cause an increased electromotive force to be generated in winding 15 of dynamotor C and the result is a considerably increased current through winding 3 which operates as before to render more constant the electro-motive force of generator A and hence to stabilize the electro-motive force of the dynamotor winding 15. The operation of the apparatus when the electro-motive force of generator A tends to decrease will be readily understood from the foregoing.

The apparatus illustrated in Fig. 2 is particularly adapted for, though by no means limited to, use in the train carried portion of railway traffic controlling systems. In such use the generator A is the 32 volt headlight generator, and dynamotor C is arranged to supply energy at 350 volts to thermionic amplifying tubes. In such apparatus it is particularly desirable to reduce to a minimum variation in the electro-motive force of winding 15 of the dynamotor. My invention accomplishes this result in a simple, cheap and effective manner.

Although I have herein shown and described only two forms of electric regulating apparatus embodying my invention, it is understood that various changes and modifications may be made therein within the scope of the appended claims without departing from the spirit and scope of my invention.

Having thus described my invention, what I claim is:

1. In combination, a direct current generator having a main field winding, a dynamotor having a first winding connected with said generator and a second winding, an auxiliary field winding on said generator opposed to said main field winding, and means for supplying from the second winding on said dynamotor to said auxiliary winding a current the magnitude of which varies in accordance with the electro-motive force of said generator.

2. In combination, a direct current generator having a main field winding, a dynamotor connected with said generator, an auxiliary winding on said generator opposed to said main winding, and means for supplying said auxiliary winding from said dynamotor with a current the magnitude of which varies in response to variations in the electro-motive force of said generator.

3. In combination, a direct current generator having a main field winding, a dynamotor connected with said generator, an auxiliary winding on said generator opposed to said main winding, and means for supplying said auxiliary winding from said dynamotor with a current the magnitude of which varies in response to variations in the electro-motive force of said generator and the output electro-motive force of said dynamotor.

4. In combination, a direct current generator comprising a main field winding and an auxiliary field winding, a dynamotor connected with said generator, a circuit for said auxiliary winding, the impedance of said circuit being varied in accordance with variations in the electro-motive force of said generator and the electro-motive force applied to said auxiliary winding being varied in accordance with the output electro-motive force of said dynamotor.

5. In combination, a direct current generator comprising a main field winding, a dynamotor comprising a first winding connected with said generator, and a second winding connected with a load, an auxiliary field winding on said generator connected in parallel with said load, and means for varying the impedance of the circuit including said auxiliary winding in response to variations in the electro-motive force of said generator.

6. In combination, a direct current generator comprising a main field winding, a dynamotor comprising a first winding connected with said generator and a second winding connected with a load, an auxiliary field winding on said generator connected in parallel with said load, and an electron tube interposed between said auxiliary winding and said dynamotor for varying the impedance of the circuit including said auxiliary winding in response to variations in the electro-motive force of said generator.

7. In combination, a direct current generator comprising a main field winding, a dynamotor comprising a first winding connected with said generator and a second winding connected with a load, an auxiliary field winding on said generator connected in parallel with said load, and an electron tube interposed between said auxiliary winding and said dynamotor and comprising a cathode connected with said generator.

8. In combination, a direct current generator comprising an armature and a main field winding connected in parallel, a dynamotor comprising a first winding connected with said generator and a second winding having its negative terminal connected with the negative terminal of said generator, an auxiliary field winding on said generator for creating flux in opposition to the flux created by the main winding and having one terminal connected with the positive terminal of said dynamotor, and an electron tube comprising a hot cathode connected with said generator and an anode connected with the remaining terminal of said auxiliary winding.

In testimony whereof I affix my signature.

BERNARD E. O'HAGAN.